US012707191B2

(12) United States Patent
Guo et al.

(10) Patent No.: US 12,707,191 B2
(45) Date of Patent: Aug. 11, 2026

(54) SPEAKER MODULE AND ELECTRONIC DEVICE

(71) Applicant: HONOR DEVICE CO., LTD., Shenzhen (CN)

(72) Inventors: Zhihao Guo, Shenzhen (CN); Hao Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 91 days.

(21) Appl. No.: 18/578,439

(22) PCT Filed: Dec. 22, 2022

(86) PCT No.: PCT/CN2022/140884
§ 371 (c)(1),
(2) Date: Jan. 11, 2024

(87) PCT Pub. No.: WO2023/160191
PCT Pub. Date: Aug. 31, 2023

(65) Prior Publication Data

US 2024/0340577 A1 Oct. 10, 2024

(30) Foreign Application Priority Data

Feb. 24, 2022 (CN) ......................... 202210177035.7

(51) Int. Cl.

| | |
|---|---|
| ***H04R 1/28*** | (2006.01) |
| ***H04R 1/02*** | (2006.01) |
| ***H04R 9/06*** | (2006.01) |

(52) U.S. Cl.
CPC ............ *H04R 1/288* (2013.01); *H04R 1/021* (2013.01); *H04R 1/025* (2013.01); *H04R 9/06* (2013.01); *H04R 2499/11* (2013.01)

(58) Field of Classification Search
CPC .... H04R 2499/11; H04R 1/025; H04R 1/288; H04R 9/06; H04R 1/021; H04R 2499/15;
(Continued)

(56) References Cited

U.S. PATENT DOCUMENTS

| | | | | |
|---|---|---|---|---|
| 5,629,502 A | 5/1997 | Nakano | | |
| 10,015,574 B1 * | 7/2018 | Luce | ........................ | H04R 1/04 |

(Continued)

FOREIGN PATENT DOCUMENTS

| | | |
|---|---|---|
| CN | 1122561 A | 5/1996 |
| CN | 201251481 Y | 6/2009 |

(Continued)

*Primary Examiner* — Carolyn R Edwards
*Assistant Examiner* — Julie X Dang
(74) *Attorney, Agent, or Firm* — WOMBLE BOND DICKINSON (US) LLP

(57) ABSTRACT

This application provides a speaker module and an electronic device, and the electronic device includes a speaker module. The speaker module includes a shell, a vibration assembly, and a damping film, where the vibration assembly is mounted in an inner portion of the shell, the vibration assembly divides the inner portion of the shell into a front cavity and a back cavity, the shell is provided with a through hole, the through hole is communicated with the front cavity and the back cavity, and the damping film is mounted in the inner portion of the shell and covers the through hole, where an elastic modulus of the damping film is less than an elastic modulus of the vibration assembly.

20 Claims, 5 Drawing Sheets

(58) Field of Classification Search

CPC ...... H04R 1/2811; H04R 1/2834; H04R 9/02; H04R 1/028; H04R 2400/11; H04R 7/12; H04R 1/345; H04R 9/025; H04R 1/26; H04R 5/02; H04R 7/10; H04R 31/003; H04R 1/24; H04R 17/00; H04R 7/08; H04R 9/045; H04R 1/023; H04R 2201/021; H04R 2205/024; H04R 2307/029; H04R 2307/201; H04R 2400/07; H04R 2440/03; H04R 2440/05; H04R 2440/07

See application file for complete search history.

(56) References Cited

U.S. PATENT DOCUMENTS

| | | | | |
|---|---|---|---|---|
| 10,425,720 | B1* | 9/2019 | Cho | H04R 1/2857 |
| 11,265,646 | B2 | 3/2022 | Zhou | |
| 2015/0160469 | A1 | 6/2015 | Wakamatsu | |
| 2017/0359650 | A1* | 12/2017 | Wexler | H04N 7/185 |
| 2022/0053262 | A1* | 2/2022 | Wei | H04R 9/025 |
| 2023/0007372 | A1* | 1/2023 | Yang | H04R 1/021 |

FOREIGN PATENT DOCUMENTS

| | | | | |
|---|---|---|---|---|
| CN | 206226704 | U | * | 6/2017 |
| CN | 108419188 | A | | 8/2018 |
| CN | 208971757 | U | | 6/2019 |
| CN | 110475185 | A | | 11/2019 |
| CN | 210641058 | U | | 5/2020 |
| CN | 211089963 | U | | 7/2020 |
| CN | 211930818 | U | | 11/2020 |
| WO | 2019153916 | A1 | | 8/2019 |

* cited by examiner

SPEAKER MODULE AND ELECTRONIC DEVICE

CROSS-REFERENCE TO RELATED APPLICATIONS

This application is a national stage of International Application No. PCT/CN2022/140884, filed on Dec. 22, 2022, which claims priority to Chinese Patent Application No. 202210177035.7, filed on Feb. 24, 2022. The disclosures of both of the aforementioned applications are hereby incorporated by reference in their entireties This application is a national stage of International Application No. PCT/CN2022/140884, filed on Dec. 22, 2022, which claims priority to Chinese Patent Application No. 202210177035.7, filed on Feb. 24, 2022. The disclosures of both of the aforementioned applications are hereby incorporated by reference in their entireties.

TECHNICAL FIELD

This application relates to the field of speaker technologies, and in particular, to a speaker module and an electronic device.

BACKGROUND

As popularity of electronic devices such as mobile phones is increasing, upgrading the electronic devices is also getting faster and faster, and requirements of users for the electronic devices are also getting higher and higher. In the current electronic devices, electrical energy is converted into sound energy mainly with speaker modules to implement sound production. However, audio performance of the existing speaker modules is poor, and therefore it is difficult to meet requirements of the users for the audio performance of the speaker modules.

SUMMARY

This application provides a speaker module and an electronic device, to improve audio performance of the speaker module and meet requirements of a user for the audio performance of the speaker module.

According to a first aspect, this application provides a speaker module, including a shell, a vibration assembly, and a damping film, where the vibration assembly is mounted in an inner portion of the shell, the vibration assembly divides the inner portion of the shell into a front cavity and a back cavity, the shell is provided with a through hole, the through hole is communicated with the front cavity and the back cavity, and the damping film is mounted in the inner portion of the shell and covers the through hole, where an elastic modulus of the damping film is less than an elastic modulus of the vibration assembly.

In the speaker module shown in this application, the damping film is added. Since the elastic modulus of the damping film is less than the elastic modulus of the vibration assembly, when the speaker module is working, the damping film can buffer a deformation or a swing of a diaphragm caused due to a change of gas pressure in the back cavity, reducing the noise produced by the speaker module, improving the sound quality of the speaker module, improving the audio performance of the speaker module, and meeting the requirements of the user for the audio performance of the speaker module.

In an implementation, the shell includes a main shell and a partition board, the partition board is fixedly connected to an inner portion of the main shell, the partition board is provided with a mounting hole and the through hole, both the mounting hole and the through hole run through the partition board in a thickness direction of the partition board, the mounting hole and the through hole are spaced apart, both the vibration assembly and the damping film are mounted on the partition board, and the vibration assembly covers the mounting hole.

In an implementation, a material of the damping film includes one or more of polycarbonate, acrylic ester, polylactic acid, and butyronitrile.

In an implementation, an effective area of the vibration assembly is $S_1$, an effective area of the damping film is $S_2$, an effective vibration volume of the vibration assembly in the back cavity is $V_1$, an effective vibration volume of the damping film in the back cavity is $V_2$, and a relationship among the four satisfies:

$$\frac{S_1 A_1}{\alpha V_1} = \frac{S_2 A_2}{V_2}$$

where $A_1$ is an amplitude of the vibration assembly 21, $A_2$ is a maximum amplitude of the damping film 30, and $\alpha$ is a compensation coefficient.

In an implementation, there are a plurality of through holes, the plurality of through holes are spaced apart, the damping film includes a plurality of damping sub-films, and each of the damping sub-films is mounted on an inner side of the shell and covers one of the through holes.

In an implementation, the shell is provided with a sound outlet, the sound outlet is communicated with the front cavity and an outer side of the shell, and the sound produced when the speaker module is working can be transmitted to the outer side of the shell through the sound outlet, thereby implementing the sound production of the speaker module.

In an implementation, the shell is provided with a leak hole, and the leak hole is communicated with the back cavity and an outer side of the shell, to ensure a gas pressure balance between the back cavity and the outer side of the shell.

In an implementation, the speaker module is a moving coil speaker module, the speaker module further includes a support assembly and a magnet assembly, the support assembly supports the vibration assembly and the magnet assembly, and the magnet assembly is configured to provide a driving magnetic field for the vibration assembly, or the speaker module is a moving iron speaker module.

According to a second aspect, this application provides an electronic device, including a housing and any one of the foregoing speaker modules, where the housing is provided with a speaker hole, the speaker hole is communicated with an inner side and an outer side of the housing, the speaker module is mounted on the inner side of the housing, and a sound outlet of the speaker module is communicated with the speaker hole.

In an implementation, the electronic device further includes a processor, and the processor is mounted on the inner side of the housing and electrically connected to the speaker module.

In the electronic device shown in this application, the damping film is added to the speaker module. Since the elastic modulus of the damping film is less than the elastic modulus of the vibration assembly, when the speaker module is working, the damping film can buffer a deformation or a swing of a diaphragm caused due to a change of gas pressure in the back cavity, reducing the noise produced by the speaker module, improving the sound quality of the speaker module, improving the audio performance of the speaker module, and meeting the requirements of the user for the audio performance of the speaker module.

BRIEF DESCRIPTION OF DRAWINGS

To describe technical solutions in embodiments of this application more clearly, the following briefly describes the accompanying drawings required for describing embodiments of this application.

DESCRIPTION OF EMBODIMENTS

The following clearly and completely describes technical solutions in embodiments of this application with reference to the accompanying drawings in embodiments of this application.

Figure 1:
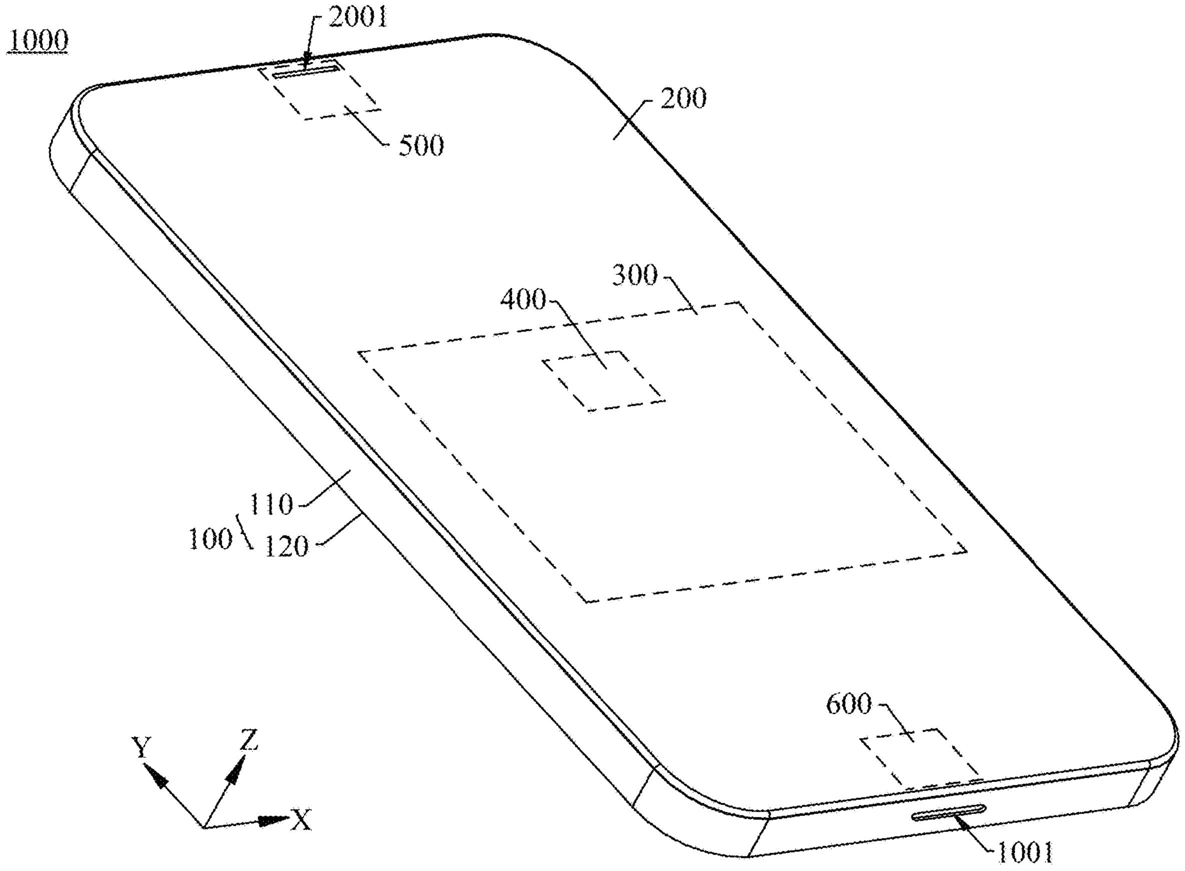
FIG. 1 is a schematic diagram of a structure of an electronic device according to an embodiment of this application.

Refer to FIG. 1. FIG. 1 is a schematic diagram of a structure of an electronic device 1000 according to an embodiment of this application.

The electronic device 1000 may be a mobile phone, a tablet computer, a notebook computer, a head unit, a smart watch, a smart band, a POS terminal (point of sales terminal, point of sales terminal), or other electronic products with a sound production function. Next, in an embodiment of this application, an example in which the electronic device 1000 is a mobile phone is used for description. For ease of description, a width direction of the electronic device 1000 is defined as an X-axis direction, a length direction of the electronic device 1000 is defined as a Y-axis direction, a thickness direction of the electronic device 1000 is defined as a Z-axis direction, and the X-axis direction, the Y-axis direction and the Z-axis direction are perpendicular to each other in pairs.

The electronic device 1000 includes a housing 100, a display module 200, a circuit board 300, a processor 400, a receiver 500, and a speaker module 600. The display module 200 is mounted on the housing 100. The circuit board 300, the processor 400, the receiver 500, and the speaker module 600 are all mounted on an inner side of the housing 100.

The housing 100 includes a frame 110 and a bottom board 120, and the bottom board 120 is fixedly connected to a side of the frame 110. The frame 110 and the bottom board 120 may be an integral structure, or may be an integrated structure formed by assembly. Specifically, the frame 110 is provided with a speaker hole 1001, and the speaker hole 1001 is communicated with the inner side and an outer side of the housing 100. For example, there is one speaker hole 1001. In some other embodiments, the bottom board 120 may alternatively be provided with the speaker hole 1001, or the frame 110 and the bottom board 120 jointly define the speaker hole 1001. The manner of forming the speaker hole 1001 is not specifically limited in this application.

The display module 200 is mounted on a side of the frame 110 that faces away from the bottom board 120. To be specific, the display module 200 and the bottom board 120 are separately located on two opposite sides of the frame 110. When a user holds the electronic device 1000 in a hand, the display module 200 faces the user, and the bottom board 120 faces away from the user. The display module 200 includes a display panel and a cover board. The cover board is fixed to the frame 110 of the housing 100, and the display panel is fixed to an inner surface of the cover board that faces the housing 100. The cover board is configured to protect the display panel, and the display panel is configured to display image information. In addition, a touch function may be further integrated into the display panel.

The display module 200 is provided with a receiver hole 2001, and the receiver hole 2001 runs through the display module 200 in a thickness direction of the display module 200 (in the Z-axis direction shown in the figure). The receiver hole 2001 is communicated with the inner side and the outer side of the housing 100. In some other embodiments, the housing 100 may alternatively be provided with the receiver hole 2001. For example, a top region of the frame 110 of the housing 100 is provided with the receiver hole 2001. Alternatively, the display module 200 and the housing 100 define the receiver hole 2001. For example, the receiver hole 2001 is formed between a top edge of the display module 200 and a top edge of the frame 110 of the housing 100. The manner of forming the receiver hole 2001 is not specifically limited in this application.

The processor 400 is mounted on the circuit board 300 and is electrically connected to the circuit board 300. The circuit board 300 may be a main board (main board) of the electronic device 1000, and the processor 400 may be a CPU (central processing unit, central processing unit) of the electronic device 1000.

The receiver 500 may be located at the top of the housing 100 and be electrically connected to the processor 400. The receiver 500 may receive an audio signal sent by the processor 400, and vibrate and produce sound according to the audio signal, and the sound diffuses into an external environment through the receiver hole 2001, to implement sound production of the electronic device 1000. The speaker module 600 may be located at the bottom of the housing 100 and be electrically connected to the processor 400. The speaker module 600 may receive an audio signal sent by the processor 400, and vibrate and produce sound according to the audio signal, and the sound diffuses into an external environment through the speaker hole 1001, to implement sound production of the electronic device 1000.

In this embodiment, the speaker module described in the following embodiments may be adopted for both the receiver 500 and the speaker module 600. In some other embodiments, a speaker module with another structure may be adopted for the receiver 500, and the speaker module described in the following embodiments may be adopted for the speaker module 600; or the speaker module described in the following embodiments may be adopted for the receiver 500, and a speaker module with another structure may be adopted for the speaker module 600.

It should be understood that the orientation terms such as "top" and "bottom" involved in this application are described with reference to the orientation when the user holds the electronic device 1000 in a hand, as shown in FIG. 1, where a positive direction of the Y-axis is taken as the "top" and a negative direction of the Y-axis is taken as the "bottom". The terms do not indicate or imply that a specified apparatus or element needs to have a specific orientation and be constructed and operated in a specific orientation, therefore should not be understood as a limitation on this application.

It should be noted that during working of an existing speaker module, the vibration assembly vibrates, causing gas pressure in a back cavity of the speaker module to change. Since a front cavity of the speaker module is in an open state, a change rate of gas pressure in the front cavity is less than a change rate of the back cavity, causing a diaphragm of the vibration assembly to deform or swing, causing the speaker module to produce noise during working, and affecting the audio performance of the speaker module. Next, the structure of the speaker module 600 shown in this embodiment of this application is described.

Figure 2:
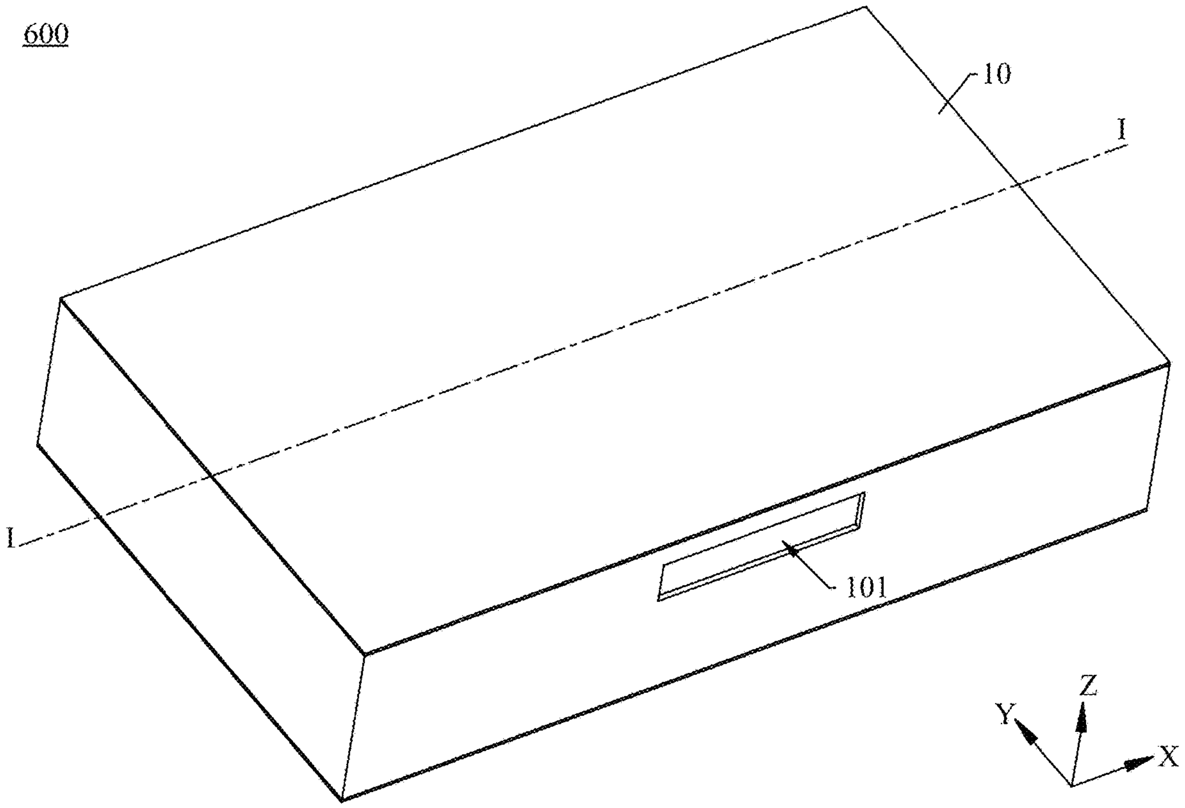
FIG. 2 is a schematic diagram of a structure of a speaker module in the electronic device shown in FIG. 1.
Figure 3:
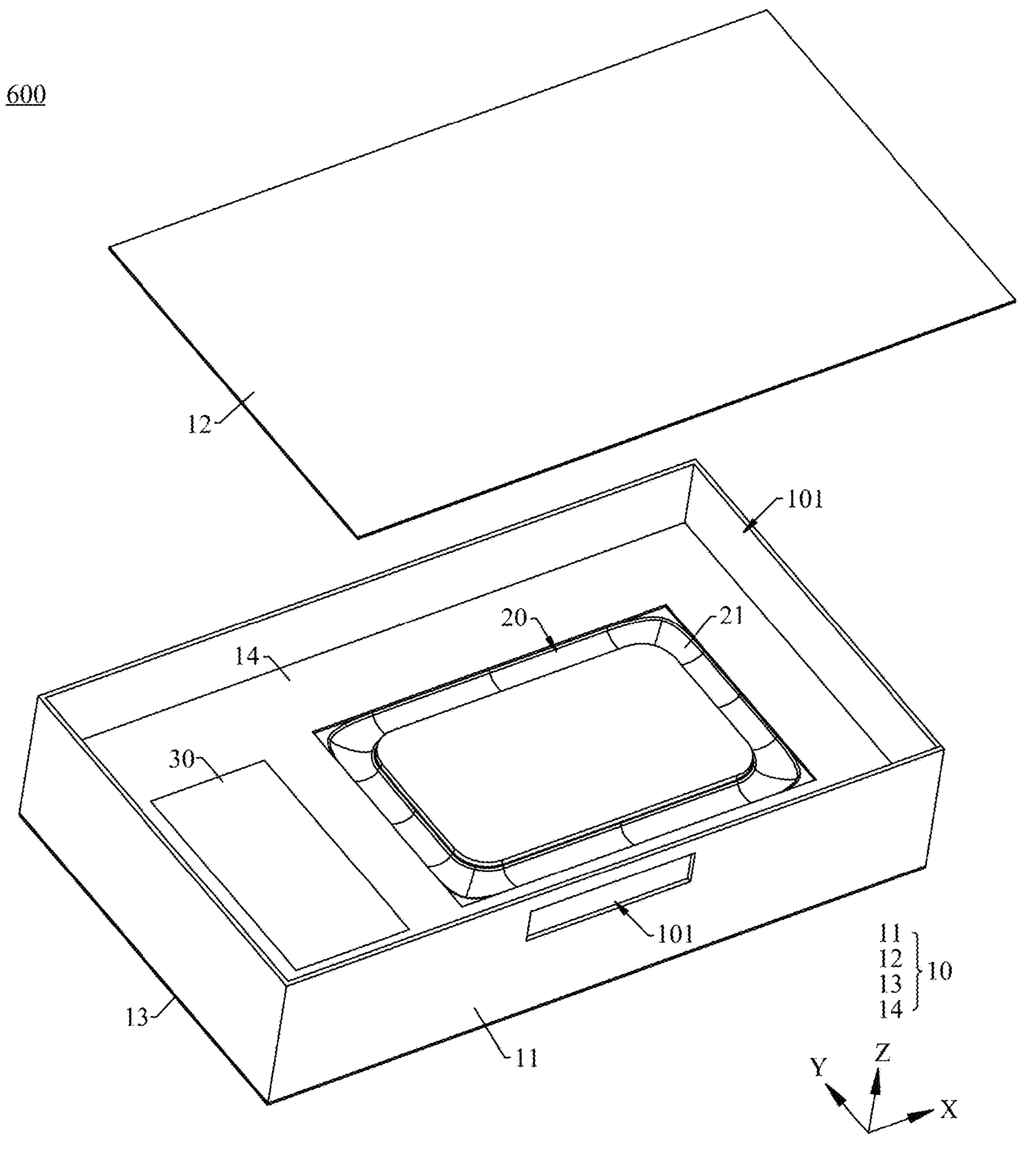
FIG. 3 is a schematic diagram of a partially exploded structure of the speaker module shown in FIG. 2.
Figure 4:
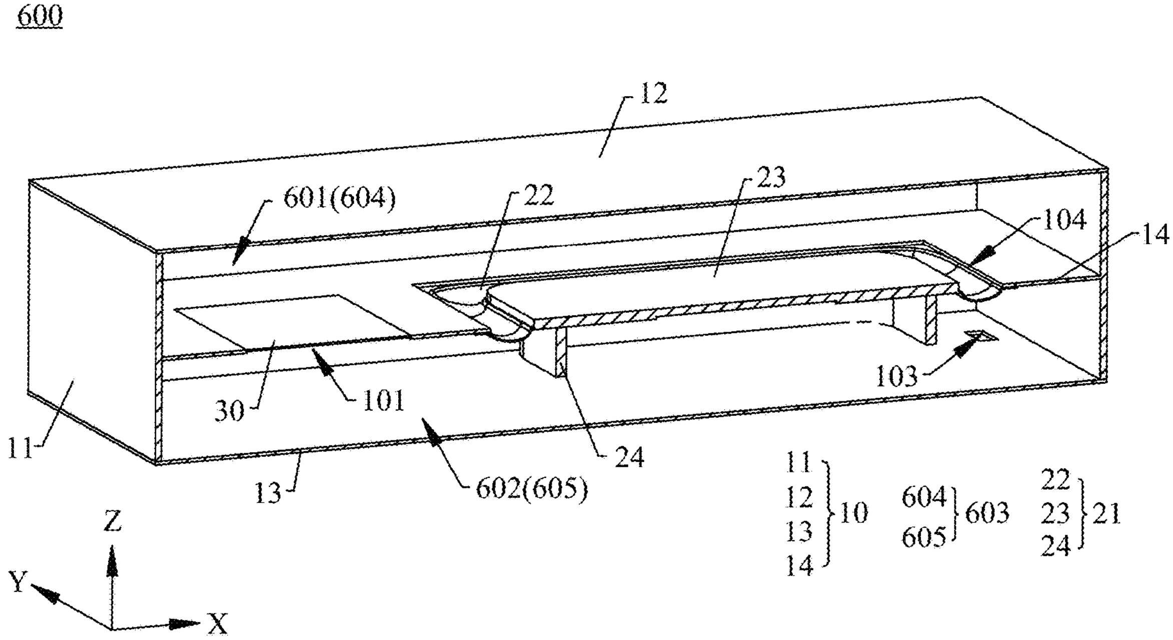
FIG. 4 is a schematic diagram of a structure of the speaker module shown in FIG. 2 that is cut along I-I.

Refer to FIG. 2, FIG. 3, and FIG. 4. FIG. 2 is a schematic diagram of a structure of the speaker module 600 in the electronic device 1000 shown in FIG. 1, FIG. 3 is a schematic diagram of a partially exploded structure of the speaker module 600 shown in FIG. 2, and FIG. 4 is a schematic diagram of a structure of the speaker module 600 shown in FIG. 2 that is cut along I-I. Cutting along I-I refers to cutting along a plane on which the I-I line is located.

For example, a length direction of the speaker module 600 is the X-axis direction shown in the figure, a width direction of the speaker module 600 is the Y-axis direction shown in the figure, and a thickness direction of the speaker module 600 is the Z-axis direction shown in the figure.

The speaker module 600 includes a shell 10, a speaker core 20, a damping film 30, and a connecting board (not shown in the figure). The speaker core 20 is mounted on an inner side of the shell 10 and divides the inner side of the shell 10 into a front cavity 601 and a back cavity 602. The speaker core 20 may convert an electrical signal into a sound signal. The shell 10 is provided with a through hole 101, and the through hole is communicated with the front cavity 601 and the back cavity 602. The damping film 30 is mounted on the inner side of the shell 10 and covers the through hole 101. The connecting board may be a circuit board. One end of the connecting board is located on the inner side of the shell 10 and is electrically connected to the speaker core 20. The other end of the connecting board is located on an outer side of the shell 10 to electrically connect to an external assembly of the speaker module 600. For example, the other end of the connecting board may be electrically connected to the processor 400 (as shown in FIG. 1).

In addition, the shell 10 is further provided with a sound outlet 102 and a leak hole 103. The sound outlet 102 is communicated with the front cavity 601 and the outer side of the shell 10. Sound produced by the speaker core 20 can be transmitted to the outer side of the shell 10 through the sound outlet 102. As shown in FIG. 1, the speaker hole 1001 of the housing 100 is communicated with the sound outlet 102 and an outer side of the electronic device 1000. The sound produced by the speaker core 20 can be transmitted to the outer side of the electronic device 1000 through the sound outlet 102 and the speaker hole 1001 in sequence. The leak hole 103 is communicated with the back cavity 602 and the outer side of the shell 10, to ensure a gas pressure balance between the back cavity 602 and the outer side of the shell 10.

In this embodiment, the shell 10 includes a main shell 11, an upper cover board 12, a lower cover board 13, and a partition board 14. Specifically, the upper cover board 12 is mounted on an upper surface of the main shell 11, and the lower cover board 13 is mounted on a lower surface of the main shell 11. The upper cover board 12, the lower cover board 13, and the main shell 11 jointly define an accommodating cavity 603 (that is, the inner side of the shell 10). The partition board 14 is mounted in the accommodating cavity 603 and divides the accommodating cavity 603 into a first accommodating cavity 604 and a second accommodating cavity 605. In some other embodiments, the shell 10 may alternatively include an upper shell and a lower shell. The upper shell and the lower shell are fixedly connected to each other to define the accommodating cavity 603. The manner of forming the accommodating cavity 603 is not specifically limited in this application.

It should be noted that the orientation terms such as "upper" and "lower" involved in this application are shown with reference to FIG. 2, where a positive direction of the Z-axis is taken as the "upper" and a negative direction of the Z-axis is taken as the "lower". The terms do not indicate or imply that a specified apparatus or element needs to have a specific orientation and be constructed and operated in a specific orientation, therefore should not be understood as a limitation on this application.

The main shell 11 is provided with a sound outlet 102, and the sound outlet 102 is communicated with the first accommodating cavity 604 and the outer side of the shell 10. The lower cover board 13 is provided with a leak hole 103, and the leak hole 103 is communicated with the second accommodating cavity 605 and the outer side of the shell 10. The partition board 14 is provided with a through hole 101 and a mounting hole 104. The through hole 101 and the mounting hole 104 both are communicated with the first accommodating cavity 604 and the second accommodating cavity 605. The through hole 101 and the mounting hole 104 are spaced apart. For example, both the through hole 101 and the mounting hole 104 are rectangular. In some other embodiments, the through hole 101 and/or the mounting hole 104 may alternatively be circular or in another irregular shape.

The speaker core 20 is mounted on the partition board 14 and covers the mounting hole 104. The speaker core 20 includes a vibration assembly 21, and the vibration assembly 21 is mounted on the partition board 14 and covers the mounting hole 104. The vibration assembly 21 is mounted on a lower surface of the partition board 14. For example, the vibration assembly 21 is mounted on the lower surface of the partition board 14 through a first adhesive layer (not shown in the figure). The vibration assembly 21, the main shell 11, the upper cover board 12, and the partition board 14 define the front cavity 601 (that is, the first accommodating cavity 604), and the vibration assembly 21, the main shell 11, the lower cover board 13, and the partition board 14 define the back cavity 602 (that is, the second accommodating cavity 605).

In this embodiment, the speaker module 600 is a moving coil speaker module. The speaker core 20 is a moving coil speaker. The vibration assembly 21 includes a diaphragm 22, a dome 23, and a voice coil 24. The dome 23 is mounted on an upper surface of the diaphragm 22, and the voice coil is mounted on a lower surface of the diaphragm 22. In addition, the speaker core 20 further includes a support assembly and a magnet assembly, the support assembly supports the vibration assembly 21, and the magnet assembly provides a driving magnetic field for the vibration assembly 21. In some other embodiments, the speaker module 600 may alternatively be a moving iron speaker module. In this case, the speaker core 20 is a moving iron speaker.

The damping film 30 is mounted on the partition board 14 and spaced apart from the speaker core 20. Specifically, the damping film 30 is mounted on an upper surface of the partition board 14. For example, the damping film 30 is mounted on the upper surface of the partition board 14 through a second adhesive layer (not shown in the figure). An elastic modulus of the damping film 30 is less than an elastic modulus of the vibration assembly 21. For example, a material of the damping film 30 includes one or more of materials such as polycarbonate (PC, polycarbonate), acrylic ester (acrylic ester), polylactic acid (PLA, polylactic acid), and butyronitrile (butyronitrile).

It should be understood that the shape of the damping film 30 is not merely limited to the rectangle shown in FIG. 3, and may alternatively be a circle or an irregular shape. In some other embodiments, there may alternatively be a plurality of through holes 101, and the plurality of through holes 101 are spaced apart from each other. The damping film 30 may alternatively include a plurality of damping sub-films, and each damping sub-film is mounted on the partition board 14 and covers one through hole 101, which is not specifically limited in this application.

In this embodiment, an effective area of the vibration assembly 21 is $S_1$, an effective area of the damping film 30 is $S_2$, an effective vibration volume of the vibration assembly 21 in the back cavity 602 is $V_1$, and an effective vibration volume of the damping film 30 in the back cavity 602 is $V_2$. A relationship among the effective area $S_1$ of the vibration assembly 21, the effective area $S_2$ of the damping film 30, the effective vibration volume $V_1$ of the vibration assembly 21 in the back cavity 602, the effective vibration volume $V_2$ of the damping film 30 in the back cavity 602 satisfies:

$$\frac{S_1 A_1}{\alpha V_1} = \frac{S_2 A_2}{V_2}$$

where $A_1$ is an amplitude of the vibration assembly 21, $A_2$ is a maximum amplitude of the damping film 30, α is a compensation coefficient, and a generally ranges from 3.0 to 5.0. In addition, a specific value of α is further adjusted with reference to both a heating effect in the back cavity and an ideal gas formula.

It should be understood that a plurality of components of the vibration assembly 21 may be divided into a first type of components and a second type of components. The first type of components (such as the diaphragm) can reflect a sound wave from the front cavity 601 to the outer side of the shell 10. The second type of components (such as the voice coil) cannot reflect a sound wave from the front cavity 601 to the outer side of the shell 10. The effective area $S_1$ of the vibration assembly 21 refers to a sum of areas of the first type of components.

The damping film 30 includes a fixed portion and an elastic portion. The fixed portion refers to one portion of the damping film 30 that is fixed to the partition board 14. The elastic portion refers to the other portion of the damping film 30 different from the fixed portion. The effective area $S_2$ of the damping film 30 refers to an area of the elastic portion.

It should be noted that when the structure of the back cavity 602 is regular, the gas in the back cavity 602 flows smoothly in the back cavity 602, and the effective vibration volume $V_1$ of the vibration assembly 21 in the back cavity 602 is equal to the effective vibration volume $V_2$ of the damping film 30 in the back cavity 602 and both are the volume of the back cavity 602. However, when the structure of the back cavity 602 is irregular, for example, the structure of the back cavity 602 is long and narrow or in an irregular shape, the gas in the back cavity 602 does not flow smoothly in the back cavity 602 due to a reason such as a narrow flow channel. As a result, the gas at positions of the vibration assembly 21 and the damping film 30 does not flow smoothly, and consequently the flow of the heat and the gas in the back cavity 602 is delayed, which reduces the sensitivity of the damping film 30. In this case, $V_1$ is a volume of a barrier-free space under the vibration assembly 21, and $V_2$ is a volume of a barrier-free space under the damping film 30.

Next, the working principle of the damping film 30 is described by considering the gas in the back cavity 602 as an ideal gas. The ideal gas formula is PV=nRT, where P is a gas pressure, Vis a gas volume, T is a temperature, n is an amount of substance in the gas, and R is a molar gas constant. It can be learned according to the ideal gas formula that, a change of the gas pressure P is related to both the gas volume V and the temperature T.

In a normal temperature environment, when the speaker module 600 is working, the volume of the back cavity 602 decreases when the vibration assembly 21 vibrates toward the back cavity 602, and therefore the gas pressure rises; and the volume of the back cavity 602 increases when the vibration assembly 21 vibrates toward the front cavity 601, and therefore the gas pressure drops. In this case, a gas pressure change amount ΔP1 of the back cavity 602 is mainly affected by a volume change generated when the vibration assembly 21 vibrates.

When the speaker module 600 is working, since the elastic modulus of the damping film 30 is less than the elastic modulus of the vibration assembly 21, the damping film 30 can form a dynamic gas pressure compensation, to fully buffer the deformation and the swing of the diaphragm 22 caused by the change of the gas pressure, and can reduce the noise produced when the speaker module 600 is working, to improve the sound quality of the speaker module 600.

In a low-temperature environment, when the speaker module 600 is working, the temperature of the back cavity 602 also increases, thereby causing the gas pressure of the back cavity 602 to increase. In this case, a gas pressure change amount of the back cavity 602 is ΔP2, which is mainly affected by a volume change generated by the temperature rise.

When the speaker module 600 is working, since the elastic modulus of the damping film 30 is less than the elastic modulus of the vibration assembly 21, the damping film 30 can form a stable gas pressure compensation, can participate, in advance, in buffering the deformation and the swing of the diaphragm 22 caused by the change of the gas pressure, and can reduce the noise produced when the speaker module 600 is working, to improve the sound quality of the speaker module 600.

It should be noted that as the amplitude of the vibration assembly 21 increases, a vibration frequency of the vibration assembly 21 decreases, a pressure difference between an upper side and a lower side of the damping film 30 also increases, and the damping film 30 can passively adjust a volume ratio of the front cavity 601 to the back cavity 602, which helps increase a low-frequency dive ability of the speaker module 600, reduce harmonic distortion noise caused due to a reason such as the deformation or the swing of the diaphragm 22 under a large amplitude condition, and improve the audio performance of the speaker module 600.

Figure 5:
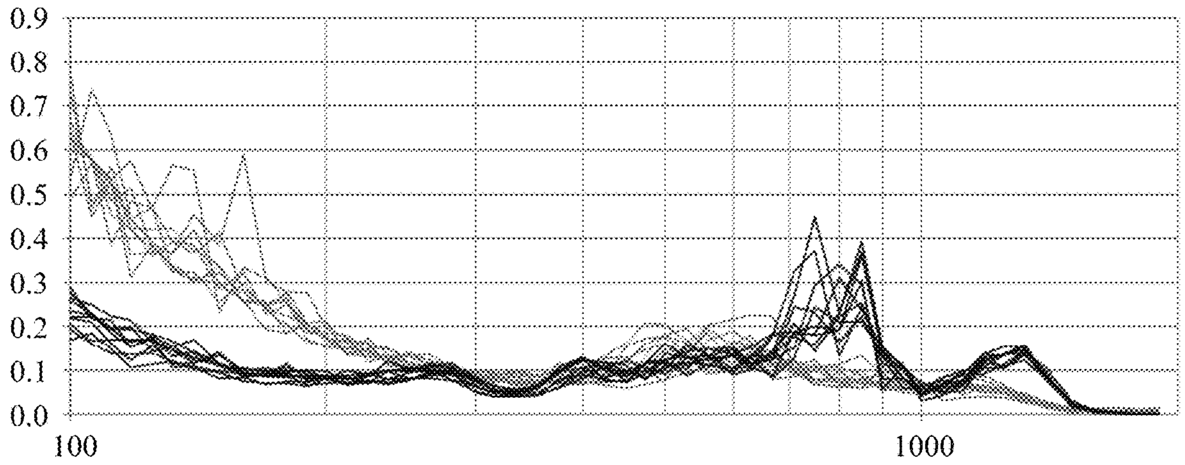
FIG. 5 is a high-order harmonic distortion curve diagram of an existing speaker module and a speaker module shown in embodiments of this application under a normal power.
Figure 6:
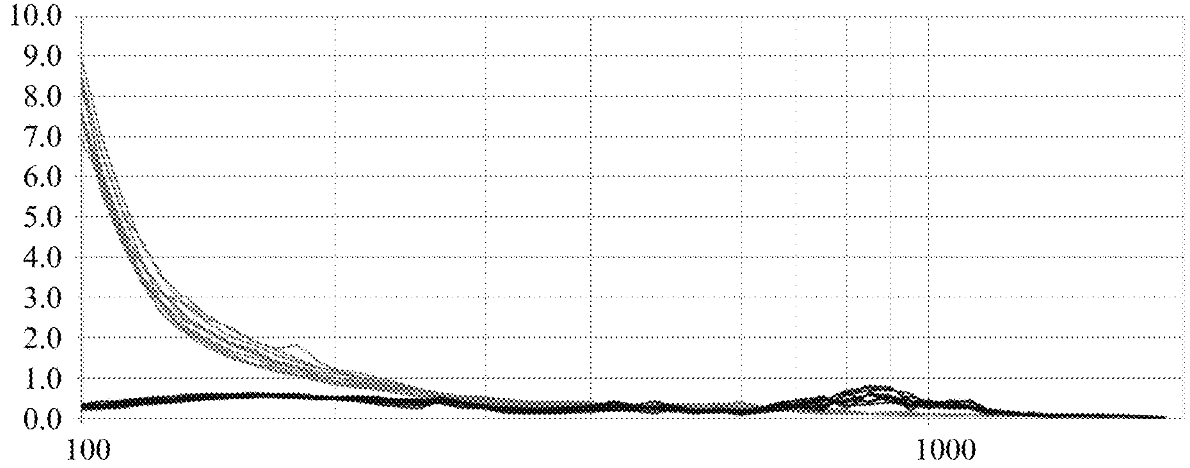
FIG. 6 is a high-order harmonic distortion curve diagram of an existing speaker module and a speaker module shown in embodiments of this application under a high power.

Refer to FIG. 5 and FIG. 6. FIG. 5 is a high-order harmonic distortion (HOHD, HO harmonic distortion) curve diagram of an existing speaker module and a speaker module shown in embodiments of this application under a normal power (NP, normal power), and FIG. 6 is a high-order harmonic distortion curve diagram of an existing speaker module and a speaker module shown in embodiments of this application under a high power (HP, high power).

In the high-order harmonic distortion curve diagrams shown in FIG. 5 and FIG. 6, the horizontal coordinate is a sound wave frequency (in unit of Hz) and the vertical coordinate is a high-order harmonic distortion coefficient. In FIG. 5 and FIG. 6, a gray line is a high-order harmonic distortion curve of the existing speaker module, and a black line is a high-order harmonic distortion curve of the speaker module shown in embodiments of this application.

It can be learned according to FIG. 5 and FIG. 6 that, the speaker module 600 shown in embodiments of this application has a smaller distortion coefficient below 200 Hz apparently, and the sound quality produced by the speaker module 600 is better.

In the electronic device 1000 shown in this embodiment of this application, the damping film 30 is added to the speaker module 600. Since the elastic modulus of the damping film 30 is less than the elastic modulus of the vibration assembly 21, when the speaker module 600 is working, the damping film 30 can buffer a deformation or a swing of a diaphragm 22 caused due to a change of gas pressure in the back cavity 602, reducing the noise produced by the speaker module 600, improving the sound quality of the speaker module 600, improving the audio performance of the speaker module 600, and meeting the requirements of the user for the audio performance of the speaker module 600.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Embodiments in this application and features in embodiments may be mutually combined in a case that no conflict occurs. Therefore, the protection scope of this application shall be subject to the protection scope of the claims.

What is claimed is:

1. A speaker module, comprising:

a shell, a vibration assembly, a plurality of through holes, and a damping film including a plurality of damping sub-films, wherein the shell comprises a main shell and a partition board, the partition board is mounted on an inner side of the main shell, the vibration assembly is mounted in an inner portion of the shell and on the partition board, the vibration assembly divides the inner portion of the shell into a front cavity and a back cavity, the partition board is provided with a first through hole of the plurality of through holes, the first through hole of the plurality of through holes is communicated with the front cavity and the back cavity, and each of the plurality of damping sub-films is mounted on an inner side of the shell and covers one of the plurality of through holes, including a first damping sub-film of the plurality of damping sub-films covering the first through hole, wherein an elastic modulus of the damping film is less than an elastic modulus of the vibration assembly.

2. The speaker module according to claim 1, wherein the partition board is provided with a mounting hole, both the mounting hole and the first through hole run through the partition board in a thickness direction of the partition board, the mounting hole and the first through hole are spaced apart, and the vibration assembly covers the mounting hole.

3. The speaker module according to claim 1, wherein a material of the damping film comprises one or more of polycarbonate, acrylic ester, polylactic acid, and butyronitrile.

4. The speaker module according to claim 1, wherein an effective area of the vibration assembly is $S_1$, an effective area of the damping film is $S_2$, an effective vibration volume of the vibration assembly in the back cavity is $V_1$, an effective vibration volume of the damping film in the back cavity is $V_2$, and a relationship among the four satisfies:

$$\frac{S_1 A_1}{\alpha V_1} = \frac{S_2 A_2}{V_2}$$

wherein $A_1$ is an amplitude of the vibration assembly, $A_2$ is a maximum amplitude of the damping film, and a is a compensation coefficient.

5. The speaker module according to claim 1, wherein the shell is provided with a sound outlet, and the sound outlet is communicated with the front cavity and an outer side of the shell.

6. The speaker module according to claim 1, wherein the shell is provided with a leak hole, and the leak hole is communicated with the back cavity and an outer side of the shell.

7. The speaker module according to claim 1, wherein the speaker module is a moving coil speaker module, the speaker module further comprises a support assembly and a magnet assembly, the support assembly supports the vibration assembly and the magnet assembly, and the magnet assembly is configured to provide a driving magnetic field for the vibration assembly.

8. An electronic device, comprising:

a housing; and a speaker module, comprising: a shell, a vibration assembly, a plurality of through holes, and a damping film including a plurality of damping sub-films, wherein the shell comprises a main shell and a partition board, the partition board is mounted on an inner side of the main shell, the vibration assembly is mounted in an inner portion of the shell and on the partition board, the vibration assembly divides the inner portion of the shell into a front cavity and a back cavity, the partition board is provided with a first through hole of the plurality of through holes, the first through hole of the plurality of through holes is communicated with the front cavity and the back cavity, and each of the plurality of damping sub-films is mounted on an inner side of the shell and covers one of the plurality of through holes, including a first damping sub-film of the plurality of damping sub-films covering the first through hole, wherein an elastic modulus of the damping film is less than an elastic modulus of the vibration assembly; and the housing is provided with a speaker hole, the speaker hole is communicated with an inner side and an outer side of the housing, the speaker module is mounted on the inner side of the housing, and a sound outlet of the speaker module is communicated with the speaker hole.

9. The electronic device according to claim 8, wherein the electronic device further comprises a processor, and the processor is mounted on the inner side of the housing and electrically connected to the speaker module.

10. The electronic device according to claim 8, wherein the partition board is provided with a mounting hole, both the mounting hole and the first through hole run through the partition board in a thickness direction of the partition board, the mounting hole and the first through hole are spaced apart, and the vibration assembly covers the mounting hole.

11. The electronic device according to claim 8, wherein a material of the damping film comprises one or more of polycarbonate, acrylic ester, polylactic acid, and butyronitrile.

12. The electronic device according to claim 8, wherein an effective area of the vibration assembly is $S_1$, an effective area of the damping film is $S_2$, an effective vibration volume of the vibration assembly in the back cavity is $V_1$, an effective vibration volume of the damping film in the back cavity is $V_2$, and a relationship among the four satisfies:

$$\frac{S_1A_1}{\alpha V_1}=\frac{S_2A_2}{V_2}$$

wherein $A_1$ is an amplitude of the vibration assembly, $A_2$ is a maximum amplitude of the damping film, and a is a compensation coefficient.

13. The electronic device according to claim 8, wherein the shell is provided with a sound outlet, and the sound outlet is communicated with the front cavity and an outer side of the shell.

14. The electronic device according to claim 8, wherein the shell is provided with a leak hole, and the leak hole is communicated with the back cavity and an outer side of the shell.

15. The electronic device according to claim 8, wherein the speaker module is a moving coil speaker module, the speaker module further comprises a support assembly and a magnet assembly, the support assembly supports the vibration assembly and the magnet assembly, and the magnet assembly is configured to provide a driving magnetic field for the vibration assembly.

16. The electronic device according to claim 15, wherein the speaker module is a moving iron speaker module.

17. The speaker module according to claim 1, wherein the speaker module is a moving iron speaker module.

18. The speaker module according to claim 1, wherein a material of the damping film comprises butyronitrile.

19. The electronic device according to claim 8, wherein the speaker module is a moving iron speaker module.

20. The electronic device according to claim 8, wherein a material of the damping film comprises butyronitrile.

* * * * *